May 26, 1936.  E. M. GARDNER  2,041,825
HORSESHOE CALK
Filed Feb. 16, 1934
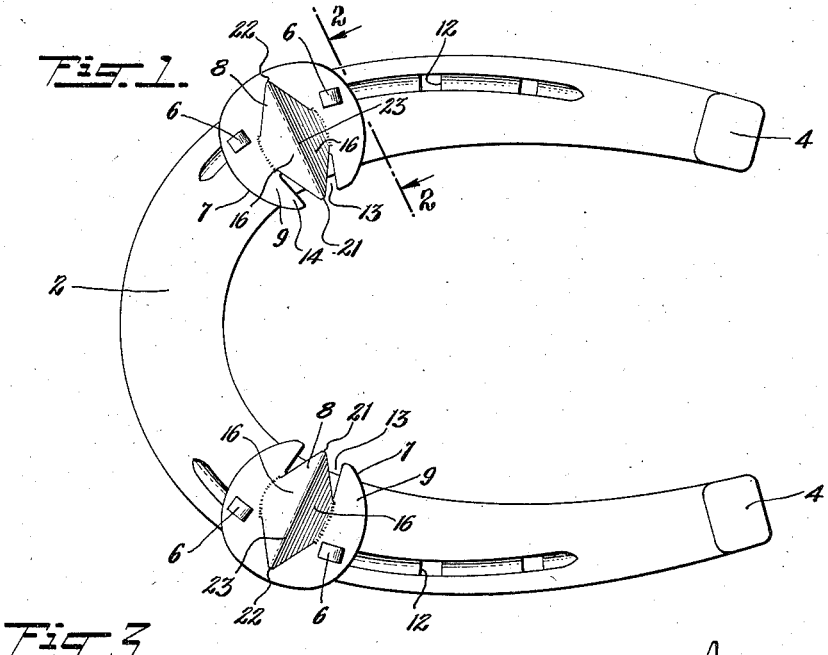
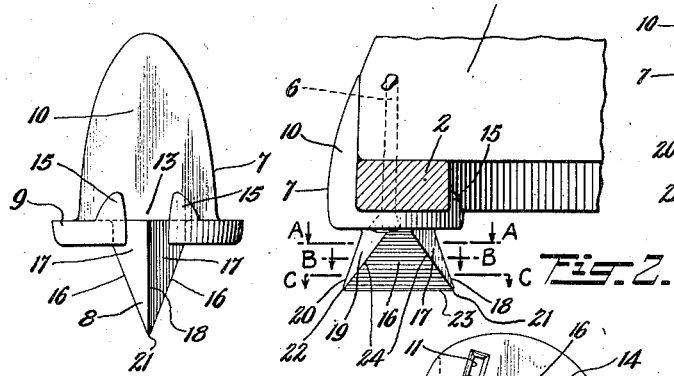
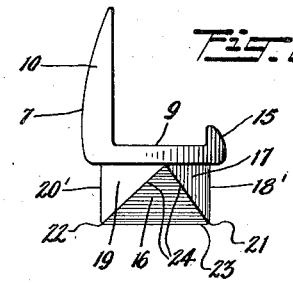
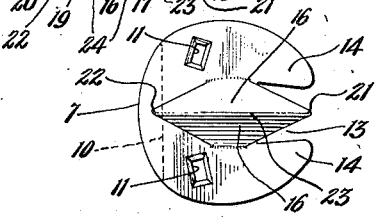
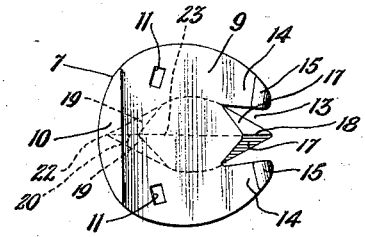
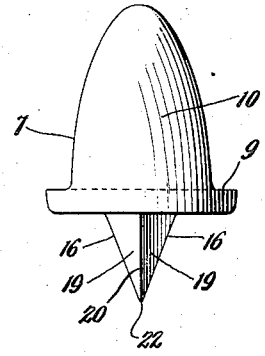
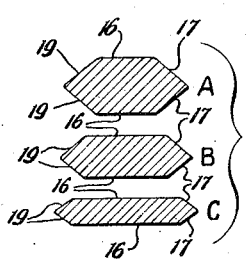
INVENTOR
Edward M. Gardner.
BY
E. C. Sanborn
ATTORNEY Patented May 26, 1936

2,041,825

UNITED STATES PATENT OFFICE 2,041,825

HORSESHOE CALK

Edward Merrill Gardner, Brooklyn, N. Y.

Application February 16, 1934, Serial No. 711,489

5 Claims. (Cl. 168—29)

This invention relates to horseshoe calks. An object is the provision of a novel and improved calk particularly effective and advantageous in preventing slipping on icy surfaces. A feature of the invention resides in provision for the continous maintaining of points at opposite ends of the cleat of the calk notwithstanding wearing down of the cleat, by which provision the cleat is enabled to dig into the icy surface whenever a tendency to slip sideways arises. The invention further provides a calk wherein an effective gripping edge of the cleat may be maintained, with a relatively small bottom area, as the cleat wears away. In addition, the calk which my invention provides is of simple and sturdy construction, inexpensive to manufacture and readily applicable to horseshoes. Other features and advantages of the invention will be hereinafter described and claimed.

In the accompanying drawing:

Fig. 1 is a bottom plan view showing a horseshoe equipped with calks embodying my invention.

Fig. 2 is a vertical sectional view through the horseshoe on the line 2—2 of Fig. 1, and showing the shoe, together with said calks, applied to a horse's hoof.

Fig. 3 is a view of one of the calks in end elevation.

Fig. 4 is a similar view from the opposite end of the calk.

Figs. 5 and 6 are, respectively, bottom and top plan views of the calk.

Figure 7 is a detail view comprising horizontal sections on lines A—A, B—B, and C—C, respectively of Figure 2 and illustrating the forms assumed by the bottom of the cleat in successive stages of wear.

Figure 8 is a side elevational view of a modified form of my invention.

Referring to the drawing, there is shown at 2 an ordinary horseshoe having the usual heel calks 4, 4. Said shoe is adapted to be fastened to the horse's hoof 5 by the nails 6 in the customary way. The calks embodying my invention are shown at 7, 7, the cleats 8, 8 thereof extending transversely of the under side of the shoe. Since the calks 7, 7 are the same in construction a description of one thereof will be sufficient for an understanding of the invention.

Each of said calks 7, 7 comprises a main body portion 9, the upper surface of which is adapted for engagement with the undersurface of one of the legs of the horseshoe 2. An upwardly projecting extension 10 of the calk is provided for engagement with the side of the horse's hoof. Holes 11, 11 extend through the body portion 9, for receiving nails 6, which are thence passed through one of the nail grooves 12, 12 in the horseshoe and into the horse's hoof, thus securing the calk in place. The calk is shown slotted at 13, providing tongue portions 14, 14 opposite the projection 10, said tongue portions having lugs 15, 15 extending above the body 9 for engagement with the inner side of the horseshoe.

The cleat 8, which extends downwardly from the body portion 9, comprises sides 16, 16 which converge from top to bottom, as shown. One end of said cleat is formed by the plane surfaces 17, 17 which extend from the sides 16, 16 and converge into the end edge 18. At its opposite end, said cleat comprises the plane surfaces 19, 19 which converge from the sides 16, 16, to the end edge 20.

With the foregoing construction it will be noted that the points 21, 22 at the opposite ends of the bottom of the cleat 8 are continually maintained as points as the cleat wears down. Each of these points is comparatively sharp, being defined by three planes (i. e., the horizontal plane at the bottom of the cleat in conjunction with end planes 17, 17, or 19, 19), said end planes 17, 17, or 19, 19 joining each other at a small acute angle. The sections A, B, and C, in Fig. 7 (taken respectively on lines A—A, B—B, and C—C of Fig. 2) illustrate the configuration of the bottom of the cleat in successive stages of wearing down thereof; and it will be readily seen that in spite of the continuing of such wear, the ends of the bottom of the cleat will be maintained as comparatively sharp points, defined by the respective end planes 17, 17 or 19, 19, and the bottom plane of the cleat. Due to this feature, if a worn cleat commences to slip on an icy surface in a direction longitudinal of said cleat (i. e., toward point 21 or point 22) point 21 or 22 at the bottom end of the cleat in the direction of the slippage would penetrate the icy surface with consequent termination of the slipping. It may be further observed in this connection that due to the motion of the horse's hoof itself, and the fact that an iced pavement is rarely if ever perfectly flat, the bottom of the cleat seldom rests flat along its entire length, wherefore as longitudinal sliding commences one or the other of the end points of the cleat of my invention will dig into the ice and block further slippage. Since, as above noted, the cleat 8 extends transversely of the hoof, side slipping of the hoof, which often is the prelude to a fall, is effectively prevented.

This is in distinct contrast to prior forms of horseshoe cleats wherein the ends of the cleats become blunt or rounded when worn, which ends continue, and in fact expedite, sliding on icy surfaces when side slipping of the hoof commences.

Furthermore, cleats constructed in accordance with my invention not only provide a long sharp gripping edge 23 for forward pulling, when new; but also, even when worn, a relatively long pulling or gripping edge (between the ends at the bottom of the cleat) is maintained, with a comparatively small bottom worn area, capable of penetrating ice more effectively than an extensive flat bottom surface. The beveling of the ends of the cleat by the provision of the plane surfaces 17, 17, and 19, 19, enables the attainment of a substantial reduction in cross sectional area of the cleat and hence of area of contact of the bottom thereof with the ground.

It will be observed that the sides 16, 16 are each shown as terminating in lines 24, 24 from which the respective end planes 17, 19 extend. The angles between the lines 24, 24 and the bottom of the cleat remain acute angles throughout the entire process of wearing down, wherefore the ends of the calk will still more readily penetrate ice.

In the cleat 8 shown in Figures 1-7 the edges 18, 20 incline inwardly from the bottom of the cleat to the top thereof. With this construction, slippage in a longitudinal direction with an end point 21 or 22 even only slightly penetrating into the ice will produce a downward component in conjunction with the inclined plane surfaces 17, 17 or 19, 19 forcing the cleat further downwardly into the ice, and stopping further slippage in an especially expeditious manner.

The edges 18, 20 of the cleat may, if desired, be vertical instead of inclined. Thus, the embodiment of my invention shown in Figure 8 is the same as that shown in the other views except that the edges 18', 20' are vertical. This form presents the same advantages with respect to maintenance of the points 21, 22, as points, during the wearing down of the cleat, and as to limitation of the bottom area during wear, that have been hereinbefore set forth; with consequent effective slippage-blocking action and surface-gripping capacity notwithstanding long-continued wear.

Both forms of calk herein disclosed also possess the advantage that they may be simply and expeditiously manufactured. They may be conveniently produced, for example, as steel drop forgings.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A horeshoe calk having means for engagement with a side of a horseshoe and a cleat integral therewith and depending therefrom said cleat having side portions sloping from top to bottom, each of said side portions having end edges inclined at an acute angle to the bottom of the cleat, said cleat also having at an end a pair of surfaces extending from end edges of said side portions and converging toward each other at an acute angle, said cleat thereby having a cutting edge extending across the bottom thereof and also a cutting edge extending the length of at least one of said end positions.

2. A horseshoe calk having a body portion with an upward projection at one end and a slot at its other end, with tongue portions on opposite sides of said slot, lugs projecting upwardly from said tongue portions, and a cleat extending downwardly from said body portion, said cleat comprising side portions sloping inwardly from top to bottom and also having at each end a pair of plane surfaces extending from said side portions and converging toward each other, one pair of said end surfaces lying directly opposite said slot.

3. A horseshoe calk adapted to be attached to and detached from a horse shoe by nails driven therethrough, said calk having a body portion with holes therein for said nails and also provided with an upward projection at one end and a slot at its other end, with tongue portions on opposite sides of said slot, lugs projecting upwardly from said tongue portions, and a cleat extending downwardly from said body portion, said cleat comprising side portions sloping inwardly from top to bottom and also having at an end a pair of plane surfaces extending from said side portions and converging toward each other.

4. A horse shoe calk adapted to be attached to and detached from a horse shoe by nails driven through the calk base, said calk comprising a base having holes for said nails and also having an upwardly extending projection for engagement with the outer side of the horse shoe, said calk further comprising an integral downwardly projecting cleat positioned between the nail holes and the longitudinal axis of which extends transversely to said projection and is thereby adapted during use to extend transversely to a horseshoe, said cleat comprising side surfaces converging at the bottom and surfaces converging at an acute angle at the outer end of the cleat nearest said projection to form a cutting edge at said outer end.

5. A horseshoe calk having means for engagement with a horseshoe and an integral cleat depending therefrom, said cleat having sides converging at an acute angle to form a cutting edge on the bottom of the cleat, and said cleat also having end surfaces converging at an acute angle to provide a cutting edge on at least one end of the cleat.

EDWARD MERRILL GARDNER.